United States Patent
Vines et al.

(10) Patent No.: US 10,623,429 B1
(45) Date of Patent: Apr. 14, 2020

(54) NETWORK MANAGEMENT USING ENTROPY-BASED SIGNATURES

(71) Applicant: Amazon Technologies, Inc., Seattle, WA (US)

(72) Inventors: Forrest MacKenzie Vines, Bonney Lake, WA (US); Lars Logen Jangaard, Seattle, WA (US); Tristan Daniel Fries e Bahia Luz-Wilson, Seattle, WA (US); Andrew Rinaldi, Seattle, WA (US); Jui Te Tseng, Seattle, WA (US); David Y. Yamanoha, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 15/713,481

(22) Filed: Sep. 22, 2017

(51) Int. Cl.
*H04L 29/06* (2006.01)
*H04L 12/26* (2006.01)
*H04L 12/855* (2013.01)

(52) U.S. Cl.
CPC ...... *H04L 63/1425* (2013.01); *H04L 43/0882* (2013.01); *H04L 47/2466* (2013.01); *H04L 63/1416* (2013.01)

(58) Field of Classification Search
CPC ............. H04L 63/1425; H04L 43/0882; H04L 47/2466; H04L 63/1416
See application file for complete search history.

(56) References Cited

U.S. PATENT DOCUMENTS

| | | | | |
|---|---|---|---|---|
| 5,991,881 | A * | 11/1999 | Conklin | H04L 41/00 709/224 |
| 6,321,338 | B1 * | 11/2001 | Porras | H04L 41/142 709/224 |
| 8,997,227 | B1 * | 3/2015 | Mhatre | H04L 63/1416 726/23 |
| 9,405,903 | B1 * | 8/2016 | Xie | G06F 21/56 |
| 9,430,646 | B1 * | 8/2016 | Mushtaq | H04L 63/1425 |
| 10,044,675 | B1 * | 8/2018 | Ettema | G06F 9/45533 |
| 2004/0078723 | A1 * | 4/2004 | Gross | G06F 11/3476 714/47.2 |
| 2006/0107321 | A1 * | 5/2006 | Tzadikario | H04L 63/0227 726/22 |
| 2008/0052774 | A1 * | 2/2008 | Chesla | G06F 21/552 726/13 |

(Continued)

*Primary Examiner* — Ghodrat Jamshidi
(74) *Attorney, Agent, or Firm* — Davis Wright Tremaine LLP

(57) ABSTRACT

Systems and methods are disclosed herein for generating a signature of an anomalous network event capable of adversely affecting the performance of a computing resource service provider. A signature computing workflow service receives network traffic information received at the computing resources service provider, and parses the network traffic information into a set of entries. The set of entries may include data for a set of parameters useable for communicating over a network. Entropy values may be calculated for the data and anomalies for the set of parameters may be detected based on changes in entropy for the set of parameters. A signature of an anomalous network traffic event may be generated based on characteristic entropy changes in the parameters associated with the anomalies. The signature may be useable to detect the presence of the network event.

20 Claims, 10 Drawing Sheets

(56) References Cited

U.S. PATENT DOCUMENTS

| | | | |
|---|---|---|---|
| 2012/0117254 A1* | 5/2012 | Ehrlich | H04L 41/142 709/228 |
| 2014/0373150 A1* | 12/2014 | Song | H04L 63/1416 726/23 |
| 2015/0121525 A1* | 4/2015 | Amoroso | H04L 63/1441 726/23 |
| 2016/0182542 A1* | 6/2016 | Staniford | H04L 63/1416 726/23 |
| 2016/0232349 A1* | 8/2016 | Baeder | H04W 4/12 |
| 2018/0063182 A1* | 3/2018 | Jones | G06F 21/6218 |
| 2018/0077120 A1* | 3/2018 | Baughman | H04L 63/0281 |

* cited by examiner

NETWORK MANAGEMENT USING ENTROPY-BASED SIGNATURES

BACKGROUND

Web-based service providers have to exchange an increasingly large volume of communications with users in connection with fulfillment of services provided. Anomalies in network traffic may affect the capacity of the service provider to efficiently and effectively fulfill requests to provide services. Such anomalies may be intentional attacks initiated by one or more users, or may be a result of an inordinate network traffic pattern. For example, distributed denial of service ("DDOS") attacks flood a service provider with service requests in an attempt to overwhelm the service provider's bandwidth. As another example, a sale in an online marketplace hosted by the service provider may elicit a flood of user traffic to purchase items.

Early detection of the occurrence of such anomalies is a complex problem due to the unpredictable nature of network traffic. By the time an anomaly has been detected, it may already be too late to initiate measures to react to the anomaly or protect against potentially adverse effects caused thereby.

BRIEF DESCRIPTION OF THE DRAWINGS

Various techniques will be described with reference to the drawings, in which.

DETAILED DESCRIPTION

Figure 1:
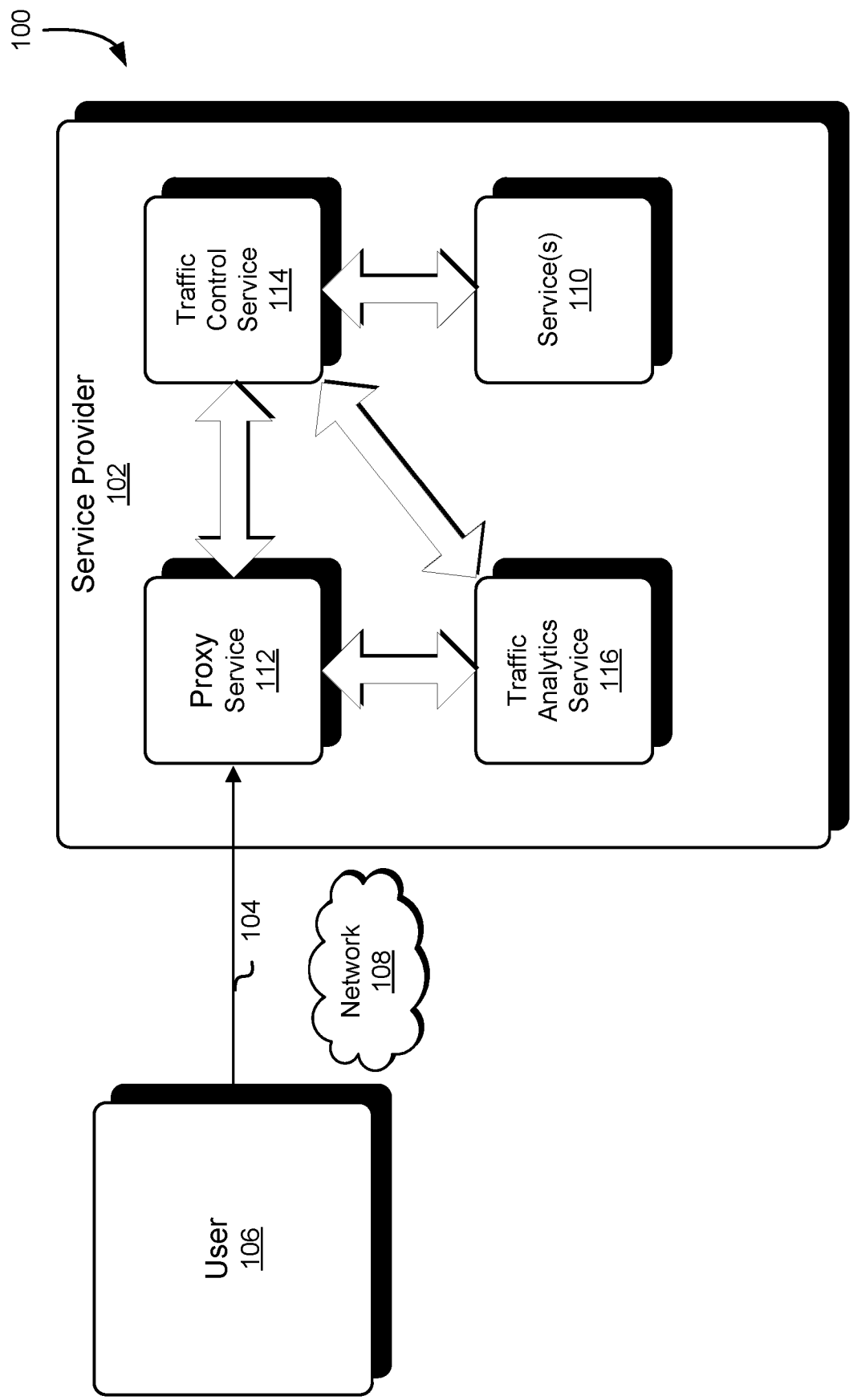
FIG. 1 shows an environment in which various embodiments may be practiced.

Techniques described and suggested herein include methods and systems for generating a signature of an anomalous network traffic event. A signature calculation workflow service may determine entropy information using network traffic information for communications received at a computing resource service provider. The described and suggested techniques enable detection of anomalous network traffic events, such as DDOS attacks or customer-driven traffic for high-velocity events, in near real-time before the events have too significant an effect on the performance of the computing resource service provider. The signature identifies or indicates a set of conditions or characteristics for a set of communication parameters that, if observed in the network traffic, indicate that the anomalous network traffic event is occurring or is about to occur. Accordingly, a network traffic controlling server of the computing resources service provider may, in response to observing or identifying the set of conditions, cause one or more actions to be performed that mitigate, prevent, or remediate the adverse effects that may be caused by the anomalous network traffic event. The signature may be used to automate a process for controlling network traffic—for instance, by controlling or otherwise modifying access to computing resources to services based on observing one or more of the set of conditions in network traffic.

The signature calculation workflow service may obtain network traffic information regarding network traffic received at the computing resource service provider. The workflow service may parse the network traffic information into a set of entries that include data for the set of communication parameters. The workflow service may determine distribution information for the set of entries by at least aggregating the number of individual instances for each distinct data entry in the set of entries. The workflow service may generate entropy information for the set of communication parameters using the set of entries. A set of anomalies may be identified for the set of communication parameters based on a change in entropy over time exceeding a predetermined threshold.

The workflow service may process the set of anomalies to determine entropy changes that resulted in determination of the presence or absence of the anomalies. The entropy changes giving rise to the determination of the presence of the anomaly within a time period are identified. The identified entropy changes may be correlated with anomalous event causing entropy changes from one or more other time periods to determine trends or characteristics for the communication parameters. The characteristics are compiled or summarized into a signature that includes a set of conditions for the set of communication parameters that, if observed in the network traffic information received by the computing resource service provider, indicate that an anomalous network traffic event is occurring or about to occur. The signature may be verified or analyzed by comparing the signature with known anomalous network traffic events to optimize or adjust the signature. The signature is provided to, or otherwise made available to, a network traffic control service, such as an application firewall, to allow the control service to circumvent the effects of an anomalous network traffic event on the computing resource service provider.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an environment 100 in which network traffic is exchanged between a requestor and a service provider. A computing resource service provider 102 receives a network communication 104 from a user 106 over a network 108. The network communication 104 may be a request for the service provider 102 to access web content, such as a website hosted by the service provider 102, or to provide one or more web-based services. The web-based services are not particularly limited and may include data storage services, cryptographic services, web-hosting services, and virtual machine provision, by way of non-limiting example. The network communication 104 may be received by a proxy service 112 of the service provider 102. The proxy service 112 routes network traffic to the services 110 of the service provider 102 via a network traffic control service 114. The network traffic control service 114 is a computer system configured to control access to the service 110. A computer system, as referred to herein is a system that can be implemented using hardware and software. A computer system may comprise one or more separate computing devices (e.g., servers, personal computing machine, virtual machine) including a processor and data storage. The proxy service 112 also routes the network traffic to a network traffic analytics service 116, which is a computer system configured to analyze the network traffic and provide policy information to the traffic control service 114. The traffic control service 114 may control the network traffic based at least in part on the policy information provided from the analytics service 116.

The analytics service 116 is a computer system configured to analyze network traffic to generate a signature from network traffic determined as corresponding to an anomalous event. The analytics service 116 may receive network traffic from the proxy service 112, parse or divide data in the network traffic into one or more parameters for communicating over a network, and aggregate the number of instances of data for each parameter. Using the aggregated number of instances of data, the analytics service 116 may calculate the entropy of the parameter for the network traffic information provided. Entropy, as described herein, refers to a measure of the unpredictability or disorder of the distribution of data for a given field or parameter. An entropy value may be defined according to the following equation (Equation 1):

$$H(X) = -\sum_{i=1}^{n} P(X_i) \log_b P(X_i)$$

where H is the measured entropy, X is a variable, n is a number of events, P is the probability of the occurrence of a specific value for the variable in the number of events n (e.g., the probability mass function), and b is the base of the logarithmic function. In computing environments, entropy generally refers to a measurement of the amount of randomness or uniqueness. In some example environments presented herein, lower levels of entropy means that there is less uniqueness or randomness, or more predictability, in a set of data whereas higher levels of entropy means that there is more uniqueness or randomness, or less predictability, in a set of data. Other measures of entropy are contemplated as being within the scope of the present disclosure, such as estimated entropy (e.g., estimating entropy of the system according to probabilistic or statistical functions), Shannon entropy, or entropy determined based on the Markov model, by way of non-limiting example. Those of ordinary skill in the art will appreciate that some methods of determining entropy (e.g., estimating entropy) may have a lower computational cost than strict calculation of entropy, but may also be less accurate than calculating entropy, such as by calculation using Equation (1) above.

The analytics service 116 may then determine a change in entropy for the parameter over time, which may include comparing the calculated entropy with one or more previously obtained entropy values. The analytics service 116 may detect anomalies in the network information based on entropy changes for the parameter, such as where an entropy change exceeds an appropriate range for the parameter. In one embodiment, the analytics service 116 may correlate a plurality of anomalies occurring within a time period for different communication parameters, and generate a signature determined as being indicative of the anomalies. The signature may include a set of characteristics for data of one or more of the parameters that indicate a likelihood that an anomalous network event may occur. One example of a signature may be a fingerprint of the anomalous network event having a set of characteristics—for entropy information of the communication parameters—that is unique to the anomalous network event. The analytics service 116 may provide the signature to the traffic control service 114 for detecting network information exhibiting characteristics similar to the signature. In response to detecting network information having characteristics similar to the signature, the traffic control service 114 may initiate measures to mitigate, prevent, or remediate any adverse effects that may be caused by the anomalous event, such as by blocking network traffic having the characteristics. Accordingly, the control service 114 may circumvent potentially harmful network events before they can adversely affect the services 110 or the service provider 102.

Figure 2:
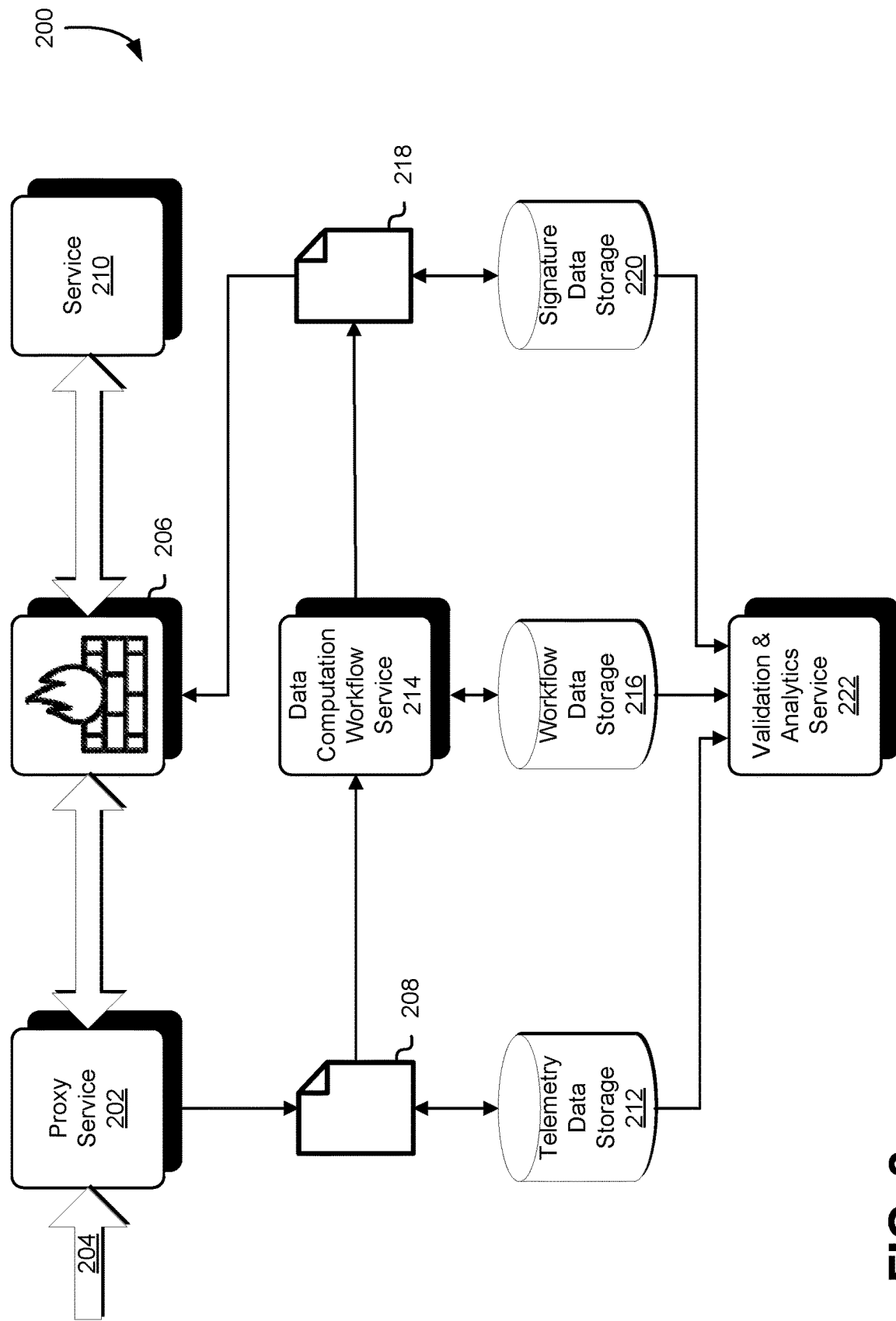
FIG. 2 shows an environment for generating a signature of an anomalous network traffic event.

FIG. 2 shows an environment 200 in which a network traffic analytics service of a computing resource service provider may generate and provide a signature characteristic of a network anomaly. A proxy service 202 receives network traffic 204 from a user, and provides network traffic to an application firewall 206 and network traffic information to a data processing service 208. The network traffic 204 may include comprise individual communications from one or more users attempting to interact with a service 210 of the service provider. The individual communications of the network traffic 204 may include content, such as a request for services, and network traffic information comprising communication parameter data for one or more communication parameters useable for communicating with the service provider over a network. The one or more communication parameters may indicate an internet protocol ("IP") address, user data (e.g., user software agent acting on behalf of a user), HyperText Transfer Protocol ("HTTP") compression, and/or communication protocol (e.g., File Transfer Protocol, DNS, web browsing), by way of non-limiting example.

The proxy service 202 is a computer system configured to relay network traffic from a user residing on an untrusted network, such as the internet, to services or applications of the service provider residing on a private network. The proxy service 202 may comprise one or more computing resources, such as proxy servers, located on a front end of the service provider that receive network traffic from users and redirect that network traffic to services of the service provider. The proxy service 202 operates as an intermediary between the service provider and users that directs network traffic to a service based on destination information provided in a communication. The proxy service 202, for instance, may relay an authenticated communication to a service specified in the communication from a user trusted or authenticated to communicate with the service. Conversely, the proxy service 202 may relay a communication to the application firewall 206 where the user is not a user trusted or authenticated to communicate with the service. The network traffic information may include log data (e.g., a logfile) recording data associated with or included in the network traffic received at or transmitted from the service provider.

The application firewall 206 is a computer system configured to control communications between the user and the service 210 based on an applicable policy. The application firewall 206 may be a computer networking firewall operating on an application layer of a protocol stack of the service provider. The application firewall 206 may be a software-based firewall executing on one or more computing resources (e.g., servers, virtual machines, personal computers) that is configured to monitor the network traffic between the proxy service 202 and the service 210, and block communications in the network traffic that fail to comply with the applicable policy. The application firewall 206 may be dedicated to controlling network traffic associated with the particular service 210, or may be configured to control network traffic to a plurality of services that include the service 210. The application firewall 206 may store policy information, for one or more policies, that define actions to perform with respect to the service 210 based on observing characteristics in the network traffic that correspond to conditions specified in the signature. The conditions may correspond to network traffic suspected as attempting to adversely affect the service 210 or the service provider itself. In one embodiment, the service 210 is a service that is generally available to the public, such as an electronic commerce service for advertising and selling products in an online marketplace. The signature is provided to the application firewall 206 to enable the application firewall 206 to perform an automated process for blocking certain network traffic from accessing the service 210. Performing an automated process (e.g., of controlling network traffic) enables the service provider to react to and mitigate, prevent, or remediate the effects of network anomalous traffic events with speed and efficacy superior to the response of a human operator. Therefore, anomalous network traffic that would otherwise adversely affect the performance of the service provider may be prevented from doing so by controlling aspects of the network traffic in an automated manner in response to observing a signature of the anomalous network traffic.

The proxy service 202 may provide network traffic information 208 to other entities of the service provider. The network traffic information 208 may include telemetry data related to the network traffic, and may be the same as the network traffic information sent to the application firewall 206 or may be a subset of the network traffic information provided to the application firewall 206. The proxy service 202 may provide the network traffic information 208 to telemetry data storage 212 for storing and retrieving the data objects generated from the network traffic information. The telemetry data storage 212 may comprise computer-readable storage media, such as storage devices comprising memory (e.g., hard disk, optical disc, solid-state drives, magnetic tape) for storing data. The telemetry data storage 212 may store the data objects in association with contextual information associated with the object, such as the time at which the network traffic was received or information regarding the user.

The data processing service 208 may also provide the network traffic information 208 to a data computation workflow service 214. The data computation workflow service 214 is a computer system for generating a signature of an anomaly in the network traffic. The workflow service 214 may comprise a set of engines provided for performing one or more tasks or processes for generating the signature, as described below in greater detail. One or more of the engines is configured to detect or identify anomalies in the network traffic information 208 and generate anomaly data corresponding to the anomalies detected. The anomalies may correspond to abnormal network events that could adversely affect the performance of the service 210 or the service provider in general. Such abnormal network events may include DDOS attacks or attacks involving malformed requests. The workflow service 214 may store and retrieve data generated in signature generation process, such as the anomaly data and entropy data, in workflow data storage 216. By analyzing the network traffic information 208 and the anomaly information generated, the workflow service 214 may generate an anomaly signature 218 characterizing aspects of one or more anomalies. The workflow service 214 may provide the signature 218 to the application firewall 206, which uses the signature 218 to detect anomalies and block network traffic to the service 210 exhibiting one or more aspects characterized in the signature 218. The workflow service 214 may utilize various heuristics or machine-learning methods and capabilities, as described below, to optimize anomaly detection and characterization. The workflow service 214 may store signatures 218 generated in signature data storage 220 for evaluation and/or provision to the application firewall 206.

The environment 200 may include a validation and analytics service 222 comprising a computer system, including software, hardware, and a combination thereof, that processes configured to analyze, validate, and modify various aspects of the environment 200. The analytics service 222 may retrieve data stored on the telemetry data storage 212, the workflow data storage 216, and the signature data storage 220 to analyze and validate various aspects thereof. One aspect may be analysis and validation regarding whether the workflow process performed by the workflow service 214 is accurately or efficiently identifying network anomaly events based on the network traffic information 208 provided. Another aspect may be whether the workflow service 214 is generating accurate signatures 218 of the anomalies identified. A further aspect may be whether the application firewall 206 is appropriately identifying and blocking anomalous network events based on the signature 218 provided. Although not depicted in FIG. 2, the validation and analytics service 222 may interact with the workflow service 214 and/or the application firewall 206 to adjust the processes performed for generating the signature 218, identify anomalies, and/or identify and block the anomalous network events. The validation and analytics service 222 may provide policy information to the application firewall 206 (or other traffic control service(s)) specifying a set of rules and corresponding actions to be performed based on satisfaction of one or more of the set of rules. For example, the policy information may instruct the application firewall 206 to automatically block network traffic that has characteristics corresponding to the signature indicated in the signature information.

The network traffic control service is described in FIG. 2 as being an application firewall; however, the network traffic control service may be other services that control traffic to a service of the computing resource service provider based at least in part on the signature. In one embodiment, the traffic control service may distribute network traffic between a plurality of services in order to balance the load between the services. This may be useful in situations where a large amount or high-velocity of legitimate (e.g., non-malicious) network traffic is directed to a particular type of service, such as an e-commerce service. In another embodiment, the traffic control service may prioritize certain network traffic over other network traffic. In a further embodiment, the traffic control service may delay certain network traffic in favor of other network traffic. Those of ordinary skill in the art will appreciate that these examples are illustrative of the myriad ways of controlling network traffic to prevent anomalous network traffic events from affecting the performance of the service provider, and are not intended to be limiting.

Figure 3:
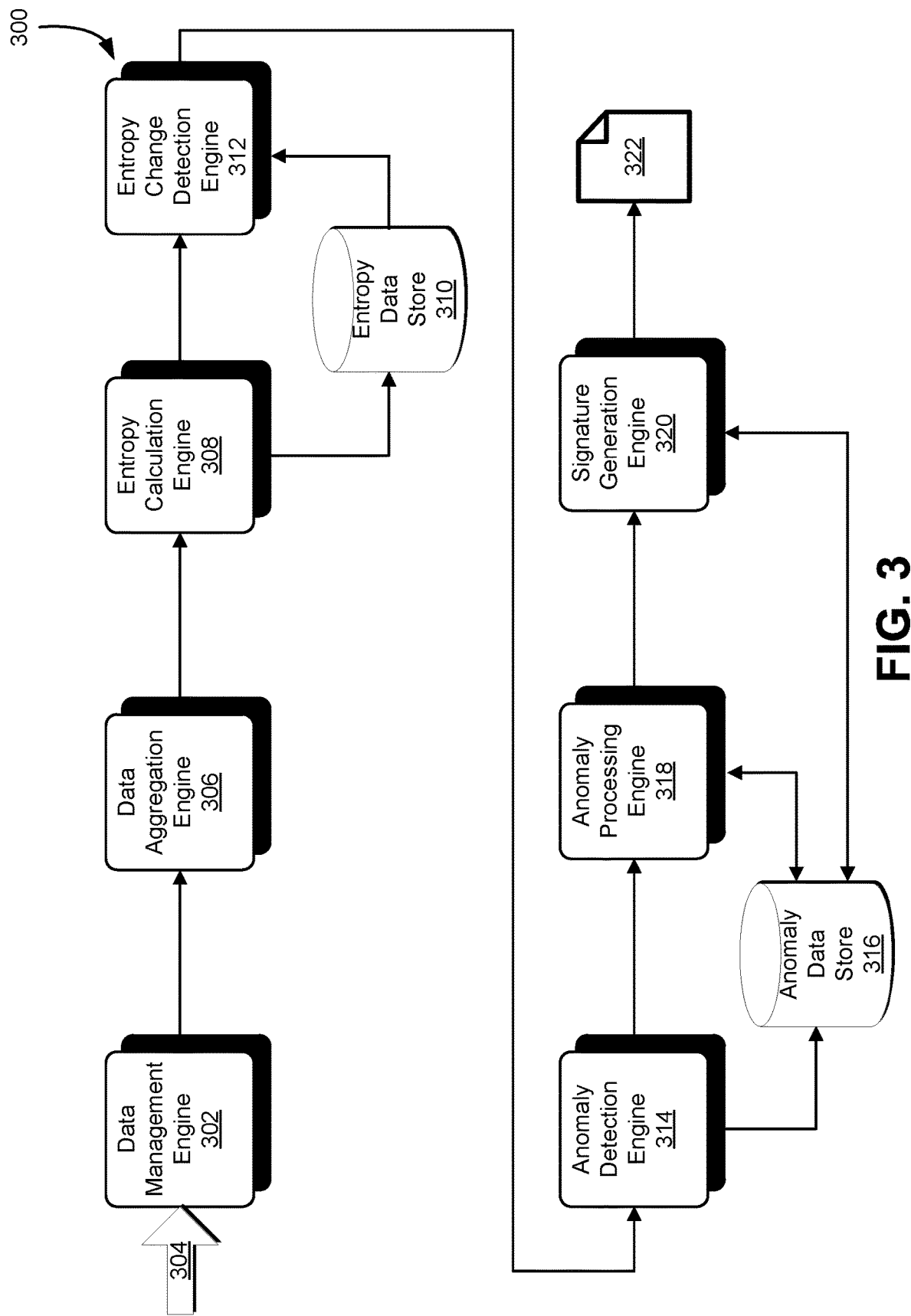
FIG. 3 shows a diagram illustrating the workflow for generating the signature of the anomalous network traffic event.

FIG. 3 shows a diagram 300 depicting a workflow process performed by a set of engines of the data computation workflow service described above with respect to FIG. 2. Each of the engines discussed herein comprise programming code executing on one or more computing resources of the service provider. A data management engine 302 receives network traffic information 304 from the proxy service, or may be retrieved or obtained from the telemetry data storage 212 described above with respect to FIG. 2. The management engine 302 is a computer system configured to receive the network traffic information 304, and parse or divide the network traffic information 304 received into individual entries. Each of the entries may comprise a set of data logging or specifying information of communications received by the service provider over a network. The set of data may include data for one or more parameters useable for communicating over the network, and may include data specific to the user or to the network communication for each parameter. The entries may also include contextual information associated with the network communication, such as data indicating a time and/or date at which the communication was received by the service provider.

The management service 302 may provide the set of entries parsed to a data aggregation engine 306. The set of entries provided may be a set of entries corresponding to network traffic information received over a given period of time. The data aggregation engine 306 is a computer system configured to analyze and process the data entries to determine information regarding the network traffic information. The aggregation engine 306 may identify communication parameters for the data in the individual entries, such as the IP address of the user, user data (e.g., user software agent acting on behalf of a user), compression useable for the communication (e.g., deflate, gzip, deflate/gzip), and communication protocol (e.g., File Transfer Protocol, DNS, web browsing), by way of non-limiting example. The aggregation engine 306 may identify the distinct data entries provided in for each communication parameter, such as the distinct IP addresses provided, the types of user software agents, the compression types useable for communication, and types of communication protocols. The aggregation engine 306 may aggregate or count the number of instances for each distinct data entry to generate distribution information, such as aggregating the number of particular instances for each IP address provided in the network traffic information 304. The aggregation engine 306 may also determine additional information regarding the set of entries, such as the number of entries in the set of entries or the period of time in which the set of entries was received.

The aggregation engine 306 may provide the aggregated parameter information and the additional information to an entropy calculation engine 308. The entropy calculation engine 308 is a computer system that may use the aggregated parameter information and the additional information to calculate an entropy for one or more of the communication parameters. For instance, the entropy calculation engine 308 may calculate an entropy for the IP addresses, an entropy for each type of the user data, an entropy for the compression, and/or an entropy for the communication protocols. The entropy calculation engine 308 may use Equation 1 or any other appropriate entropy equation to calculate the entropy for the communication parameters. In using Equation 1, the base of the logarithmic function b may use base 2 to calculate the Shannon entropy, base e (i.e., using the natural logarithm function), any other value for appropriately calculating the entropy of the communication parameters. The entropy calculation engine 308 may store the calculated entropy values in entropy data storage 310 in association with one or more identifiers for the entropy, such as the time period in which the network traffic information 304 was received by the service provider, or the communication parameter associated with the particular entropy value.

The entropy calculation engine 308 provides one or more of the entropy values to an entropy change detection engine 312. The entropy change detection engine 312 is a computer system collectively configured to determine changes in entropy over time for the one or more communication parameters. For one or more of the communication parameters, the entropy change detection engine 312 may determine whether there is a difference between a first entropy value calculated by the entropy calculation engine 308 with a second calculated entropy value. For instance, the entropy change detection engine 312 may calculate a difference between an entropy value $H_N$ corresponding to the most recently obtained set of entries (i.e., the entropy value $H_N$ of the Nth set of entries), and an entropy value $H_{N-1}$ corresponding to the set of entries immediately preceding the most recently obtained set of entries (i.e., the entropy value $H_{N-1}$ corresponding to the (N−1)th set of entries). In one embodiment, the entropy change detection engine 312 may calculate differences between multiple entropy values. For example, the entropy change detection engine 312 may calculate a difference between $H_N$ and $H_{N-1}$, and a difference between $H_{N-1}$ and $H_{N-2}$ (i.e., the entropy value corresponding to the set of entries immediately preceding the (N−1)th set of entries). As another example, the detection engine may calculate a difference between $H_N$ and $H_{N-2}$. The entropy change detection engine 312 may provide, to an anomaly detection engine 314, an indication that a change was detected in one or more entropy values for one or more communication parameters, and provide information regarding the change in entropy detected, such as a calculated change or difference ΔH between one or more entropy values in association with the communication parameter for which the entropy change ΔH was detected. The entropy change detection engine 312 may provide the entropy change ΔH in association with time information indicating the time periods in which the network information 304 was received by the service provider, such that the entropy change ΔH is time correlated as a change in entropy over time.

The anomaly detection engine 314 is a computer system configured to identify or detect anomalies in network traffic based on changes in entropy. The anomaly detection engine 314 receives one or more entropy changes ΔH from the entropy change detection engine 312 and analyses the entropy changes to determine the existence of an anomaly in the network traffic. The anomaly detection engine 314 may determine whether the entropy value ΔH corresponds to a network traffic anomaly using an appropriate method, as described below. The anomaly detection engine 314 may store information regarding anomalies detected in an anomaly data store 316 in association with information regarding the network traffic corresponding to the anomaly, such as a time period corresponding to the anomalous network traffic or identification information for the network traffic itself.

Various methods of determining anomalies in network traffic for a communication parameter. One method includes determining whether the entropy change ΔH exceeds a predetermined threshold change value for the respective communication parameter. If the entropy change ΔH exceeds a predetermined threshold for the communication parameter, the anomaly detection engine 314 may determine or identify the existence of a network traffic anomaly; and determine that a network traffic anomaly does not exist if the entropy change ΔH is less than the threshold value for the communication parameter. Another method may include determining whether a plurality of entropy changes ΔH, each for a different communication parameter but for a same time period, exceed predetermined thresholds established for the respective communication parameters. If two or more of the plurality of entropy changes ΔH exceed the predetermined threshold for their respective communication parameters, the anomaly detection engine 314 may determine the existence of a network traffic anomaly.

Other exemplary methods for detecting anomalies in network traffic for a communication parameter may include methods that do not define a specific predetermined value comparison of the parameter with a predetermined threshold value. One such method may include determining whether the entropy change ΔH represents a significant statistical deviation from previously determined entropy changes ΔH for the respective communication parameter of the entropy. For instance, the anomaly detection engine 314 may determine the existence of a network traffic anomaly if the entropy change ΔH exceeds a predetermined standard deviation (e.g., ΔH>1.5σ) for the respective communication parameter. This may include maintaining statistical data for one or more of the communication parameters (e.g., mean) and determining the standard deviation of an entropy change ΔH from the statistical data gathered. The entropy change detection engine 314 may determine the existence of a network traffic anomaly based on a determination of whether a plurality of entropy changes ΔH for different communication parameters exceed a predetermined standard deviation of the respective communication parameters. As another further example, detection of an anomaly may be based on a function associated with a communication parameter—for instance, determining whether a derivative for the parameter satisfies a condition (e.g., absolute value of derivative exceeds a threshold value, evaluating the parameter using a second derivative test for local extrema), or determining whether the area of a curve for the parameter satisfies a condition (e.g., area of a curve exceeds threshold value for parameter). Determination of an anomaly may be based on using computational or numerical methods rather than strict evaluation of a function, such as by evaluating a definite integral. Detection of an anomaly may be dynamically determined, such as by comparison with a set of values calculated based on a state of the system. In one embodiment, machine-learning methods may be implemented in which a software agent or autonomous software entity determines conditions for detecting anomalies based on heedback loops or historical trends in the system. Those of ordinary skill in the art will understand that these methods of network traffic anomaly detection are non-limiting illustrations of the myriad ways in which network traffic anomalies may be detected. The predetermined thresholds may be established by an authorized user, such as a developer or system administrator for the service provider, by a machine-learning entity associated with the data computation workflow service, or by the validation and analytics service.

An anomaly processing engine 318 may receive an indication of a detected or identified anomaly from the anomaly detection engine 314. The anomaly processing engine 318 is a computer system configured to process entropy information regarding one or more anomalies detected and generate characteristic information regarding the entropy changes corresponding to the one or more anomalies. Processing the entropy change information may include obtaining data from the anomaly data store 316 or the entropy data store 310, and processing the data for each communication parameter. Generating the characteristic information may include, for each communication parameter, determining or identifying one or more trends or characteristics of the entropy change information, such as whether the entropy change is increasing or decreasing (i.e., positive or negative difference), or whether the rate of entropy change is increasing or decreasing (i.e., differences between entropy change values are becoming larger or smaller). The characteristic information may generally describe characteristics or trends in entropy for one or more communication parameters that were associated with a network traffic anomaly. Each instance of characteristic information may be stored in the anomaly data store 316 in association with the communication parameter corresponding to the characteristic information and the particular anomaly to which the characteristic information corresponds.

A signature generation engine 320 is a computer system configured to generate a signature identifying characteristics of network traffic that may indicate the occurrence of a network traffic anomaly. The signature generation engine 320 may receive anomaly characteristic information from the anomaly processing engine 318 and/or obtain anomaly characteristic information from the anomaly data store 316. The signature generation engine 320 may analyze, for each communication parameter, a set of characteristic information to determine a correlation between the set of characteristic information and network traffic anomalies. The analysis may include comparing a trend in characteristic information for one communication parameter with a trend in characteristic information for another communication parameter to ascertain an appropriate correlation therebetween. Based on the analysis, the signature generation engine 320 may generate a signature 322 that is useable by a traffic processing service, such as the application firewall, to identify—in real time—network traffic events matching or similar to previously identified network traffic events based on shared characteristics. The signature 322 may specify a set of conditions or rules regarding communication parameter data corresponding to network traffic that, if met, predict or detecting the occurrence of a network traffic event that may adversely affect the performance of the service provider. The set of conditions may include a set of logical statements (e.g., if-then) regarding communication parameter data, including the entropy thereof, that may be evaluated for predicting or detecting network traffic events.

Figure 4:
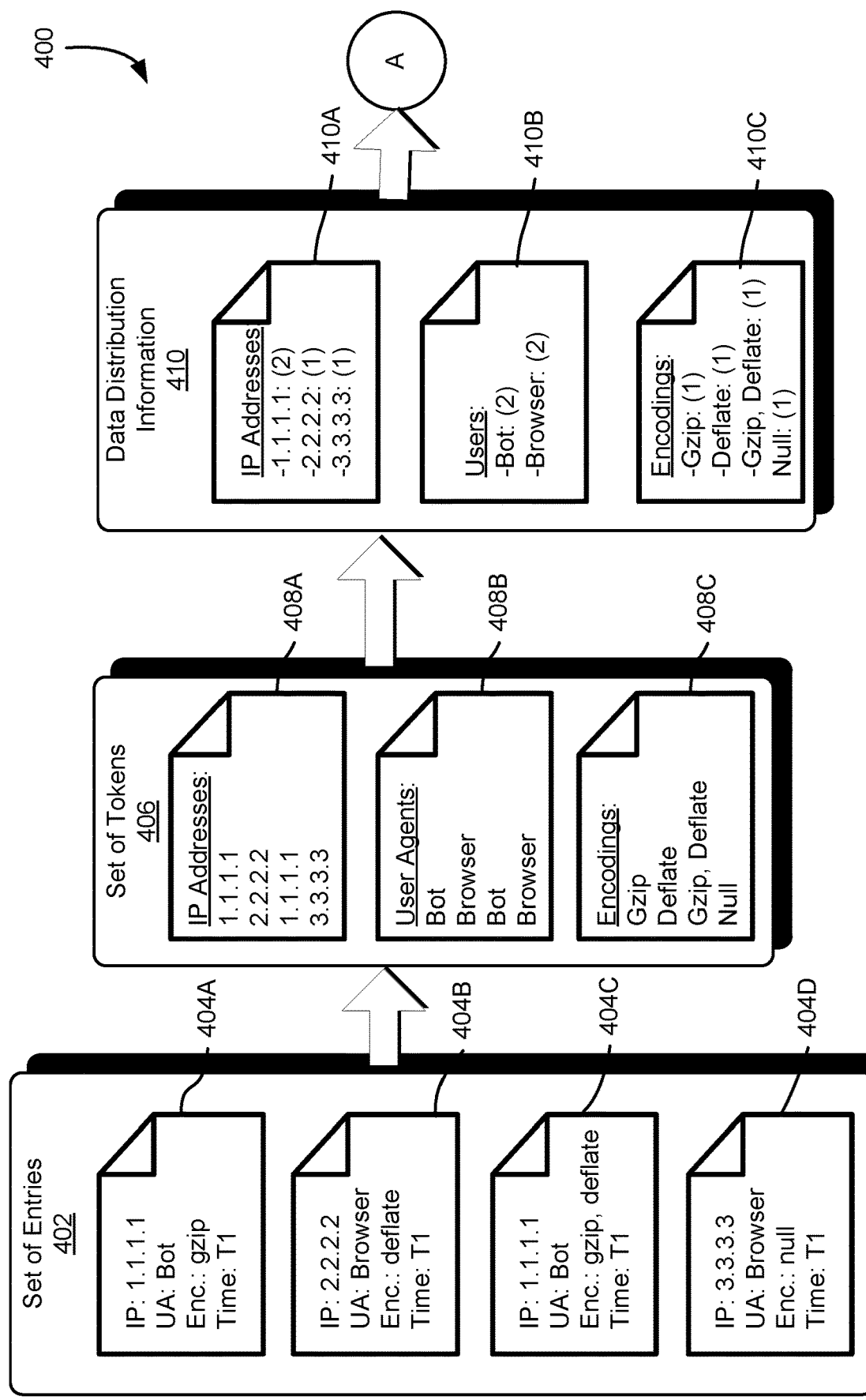
FIG. 4 shows a diagram illustrating data processing for generating the signature of the anomalous network traffic event.

FIG. 4 illustrates a diagram 400 of information generated by engines of the data computation workflow service of FIGS. 2 and 3. The data management engine receives network traffic information from the proxy service and parses the network traffic information to generate a set of entries 402 using the network traffic information. The network traffic information may include log data logging information regarding communications received at the computing resource service provider, information regarding a user or computing device submitting a communication, time information associated with the communication. Each entry 404 in the set of entries 402 may correspond to a communication received by the service provider, each entry 404 may comprise communication parameter data for each communication parameter used in communicating with the service provider over a network. For example, each entry 404 comprises an IP address of a user, a user agent ("UA") or communication application acting on behalf of the user for facilitating communication with the service provider, a compression encoding useable for encoding a message transmitted from the user agent to the service provider, and a time period at which the communication was received. The communication data for a first entry 404A includes an IP address of "1.1.1.1", a user agent identifier "Bot" (indicating that the user agent is detected as being an automated agent), a compression encoding of "gzip", and a time period "T1" at which the encoded message (i.e., network traffic) was received from the user. The data management engine 302 may parse other parameters that may be included in the set of entries 402, as described below.

The set of entries 402 may be grouped or organized into a group according to the contextual information associated with the network traffic, such as a time period at which the network traffic was received; in this instance, the time period T1. Each entry 404 may comprise other communication parameter data not shown in FIG. 4, including destination information identifying an intended service or webpage to which the communication is directed (e.g., a specific product page of an e-commerce service), a communication protocol useable for communication (e.g., Transmission Control Protocol ("TCP"), Internet Control Message Protocol ("ICMP"), HTTP, FTP), secure connection information (e.g., how session is negotiated, handshake information, or other appropriate communication parameters. The entries may include other information associated with a communication, such as header information, information of a cookie associated with the communication, user information associated with the communication (e.g., user account), port or network socket information, connection level, parameters provided in the request (e.g., URL, query string), ordering of the requests, or the like. The entries 404 may specify information regarding content of the communication, such as information indicating whether the communication was properly formed, a request method (e.g., GET, POST, PUT), or whether the communication contains malicious content (e.g., malware, virus).

The data management engine provides the set of entries 402 to the data aggregation engine, which parses and "tokenizes" communication parameter data from the set of entries 402 into a set of tokens 406. Tokenizing, as discussed herein, refers to the process of organizing entries into separate data sets corresponding to a communication parameter. The process of tokenizing may remove or disassociate sensitive network traffic information, such as user account information, when generating the tokens. The data aggregation engine reads each entry and creates or generates a respective token 408 for each communication parameter found in the entries 404. The set of tokens 406 in the diagram 400 comprises a first token 408A corresponding to IP address data, a second token 408B corresponding to user agent data, and a third token 408C corresponding to a compression encoding. In particular, the first token 408A includes an IP address instance of "1.1.1.1" parsed from the first entry 404A, an IP address instance of "2.2.2.2" parsed from the second entry 404B, an IP address instance of "1.1.1.1." parsed from the third entry 404C, and an IP address instance of "3.3.3.3" parsed from the fourth entry 404D. The second token 408B and the third token 408C each similarly include instances of communication parameter data corresponding to data parsed from the entries 404. The set of tokens 406 may be a set of separate data objects that include data for each communication parameter, or may be a part of a single data object that tracks or maintains independent data instances for each communication parameter.

The data aggregation engine may then generate data distribution information 410 regarding the data included in the tokens 408. In particular, the aggregation engine may aggregate or count, in each token 408, the number of instances of each distinct communication parameter input. For instance, the aggregation engine counts the number of instances of each particular IP address contained in the first token 408A, and generates first distribution information 410A indicating that, in the first token 408A, there were two instances of the IP address "1.1.1.1", one instance of the IP address "2.2.2.2", and one instance of the IP address "3.3.3.3.". Second distribution information 410B generated indicates that, in the second token 408B, there are two instances of "Bot" user agent, and two instances of a "Browser" user agent. Third distribution information 410C indicates that, in the third token 408C, there is one instance each of a "gzip" compression encoding, a "deflate" compression encoding, a "gzip/deflate" compression encoding, and a "null" compression encoding. The distribution information 410A through 410C may be separate data objects, or may be part of a single data object that tracks or maintains independent data instances for each communication parameter. The aggregation engine may also generate other information from the network data, such as the number of entries 404 in the set of entries 402, and time information regarding a time period of when the network traffic information was received by the service provider.

Figure 5:
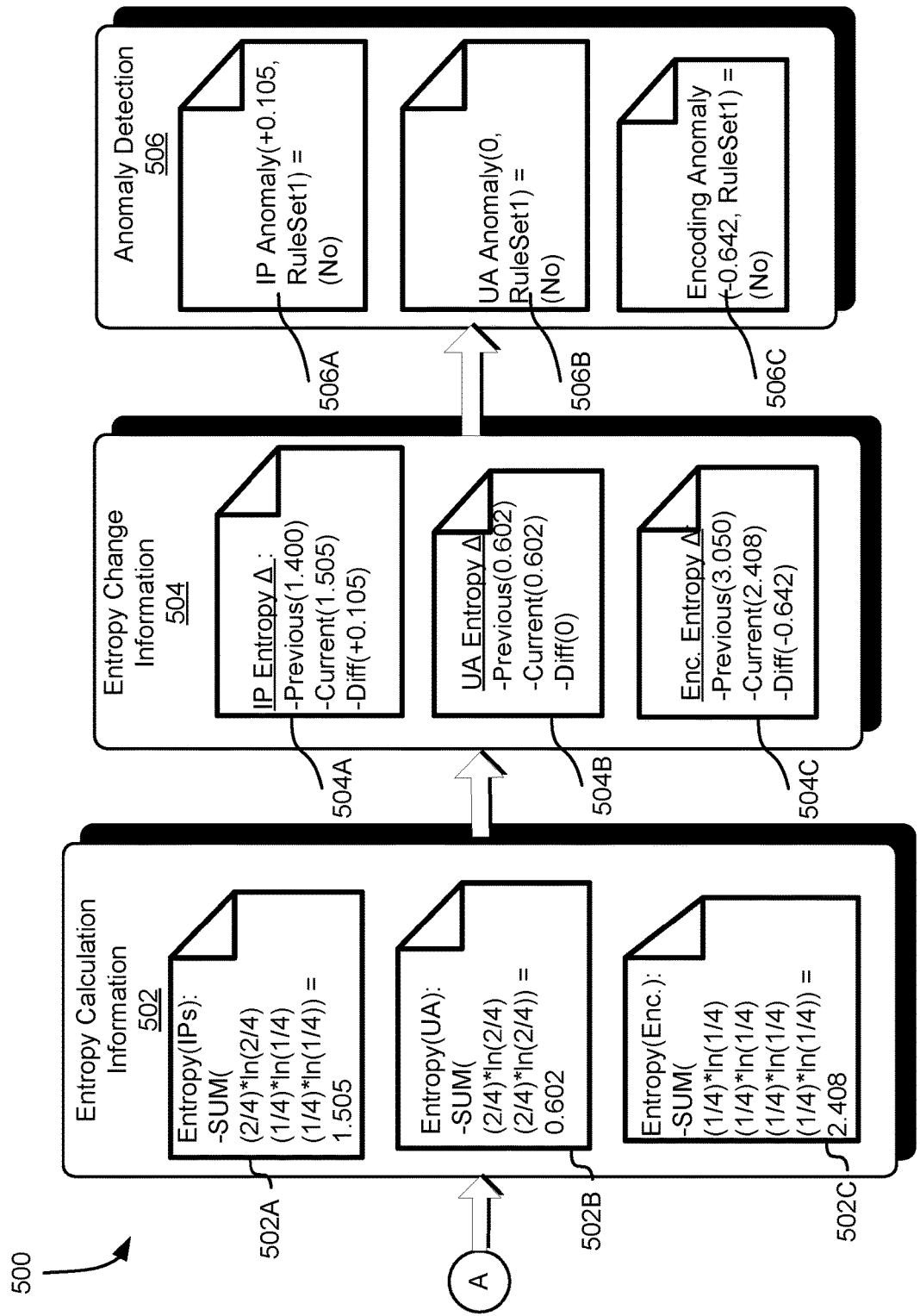
FIG. 5 shows a diagram illustrating identification of anomalies based on entropy information.

FIG. 5 illustrates a diagram 500 of information generated by engines of the engines of the data computation workflow service of FIGS. 2 and 3. The entropy calculation engine calculates entropy information using the distribution information 410 (depicted in FIG. 4) and other information provided by the aggregation engine. The entropy calculation engine may generate entropy information 502 using Equation 1, described above, or a variation thereof Generation of the entropy calculation information 502 includes generating IP address entropy information 502A using the first distribution information 410A as an input to Equation 1, generating user agent entropy information 502B using the second distribution information 410B as an input to Equation 1, and generating compression entropy information 502C using the third distribution information 410C as an input to Equation 1. Generating entropy information using Equation 1, as indicated in FIG. 5, includes using Euler's number e as the base b for the logarithmic function (i.e., using the natural logarithmic function); however, other values for the base b may be used when appropriate. Evaluating the Equation 1 to obtain IP address entropy information 502A further includes using the number of entries of the set of entries 402 (i.e., four) as the value n in association with the number of instances for each particular IP address. Specifically, for the two instances of the IP address "1.1.1.1", the entropy calculation engine evaluates the term $((2/4)*\ln(2/4))$; for the one instance of the IP address "2.2.2.2", the entropy calculation engine evaluates the term $((¼)LN(¼))$; and for the one instance of the IP address "3.3.3.3", the entropy calculation engine evaluates the term $((¼)LN(¼))$. The IP address entropy information is then calculated the negative value of the summation of the terms corresponding to each distinct IP address, resulting in the entropy value of 1.505 shown in FIG. 5. The User Agent entropy information 502B and the compression entropy information 502C are generated in a manner similar to the IP address entropy information 502A.

The entropy change engine may generate entropy change information 504 using the entropy calculation information 502. Generating the entropy change information 504 may include determining a difference between a first entropy value (i.e., of the entropy calculation information 502) and a second entropy value. The second entropy value may be an entropy value obtained from entropy calculation information for a set of entries preceding the current set of entries, and may be obtained from the entropy data store discussed above with respect to FIG. 3. IP address entropy change information 504A includes an IP address entropy difference value of (+0.105), indicating that the IP address entropy has increased based on a comparison of a current IP address entropy value of (1.505) for the set of entries 404 and a previous IP address entropy value of (1.400) for a set of entries preceding the set of entries 404. The user agent entropy change information 504B includes a user agent entropy difference value of (0) indicating that the user agent entropy is the same for the set of entropies 404 and a preceding set of entries. Compression entropy change information 504C includes a compression entropy difference value of (−0.642), indicating that the entropy for the compression has decreased.

The anomaly detection engine may generate anomaly information 506 indicating the presence or absence of anomalies in the set of entries based on the entropy change information 504. The anomaly detection engine may generate the anomaly information 506 by using the entropy change information 504 as an input to a set of rules or conditions for detecting anomalous network traffic events. The set of rules may specify one or more logical conditions that, if true, indicate the presence of the anomalous network event for one or more of the communication parameters. The anomaly detection engine may use a different set of rules for each communication parameter, or may use a single set of rules specifying logical conditions for each communication parameter. The anomaly detection information 506 includes IP address anomaly information 506A indicating that the IP address entropy change value of (+0.105) does not correspond to an anomalous network traffic event based on the set of rules "RuleSet1". Similarly, user agent anomaly information 506B and compression anomaly information 506C do not indicate the presence of an anomalous network traffic event.

The set of rules may include various logical conditions implicating one or more threshold conditions or values for the communication parameters. As one example, the set of rules may dictate that if the absolute value of an entropy change value exceeds a predetermined threshold, then an anomalous traffic event is detected. As a second example, the set of rules may dictate detection of the presence of an anomalous network traffic event if an entropy change value is positive (i.e., increasing entropy) and greater than a predetermined entropy threshold. As yet another example, the set of rules may dictate detection of the presence of an anomalous network traffic event if one or more conditions for different communication parameters are met, such as the IP address entropy change information exceeding a first predetermined value and the compression entropy change information exceeding a second predetermined value. As a further example, the set of rules may define a threshold for standard deviation, for one or more of the communication parameters, that if exceeded, indicates the existence of an anomalous network traffic event. Determining whether an entropy change value exceeds a predetermined standard deviation value (e.g., whether $\Delta H$ exceeds $1.5\sigma$) may include obtaining statistical information for one or more previous entropy change values, such as obtaining the mean for a set of previous entropy change values. Those of ordinary skill in the art will appreciate that these illustrations of sets of rules are non-limiting examples of conditions illustrating the myriad ways in which anomalous network traffic events may be detected.

The anomaly detection engine may provide a notification to a network traffic control service, as described herein, based on the anomaly detection information 506 generated. For instance, the anomaly detection engine may provide an indication that an anomaly has been detected based on the IP address entropy change information satisfying conditions specified in the set of rules. The network traffic control service may modulate aspects of the network traffic based on receiving an indication of a network traffic anomaly, such as by restricting or blocking certain network traffic having characteristics similar to the entropy change information that caused generation of the anomaly indication.

Figure 6:
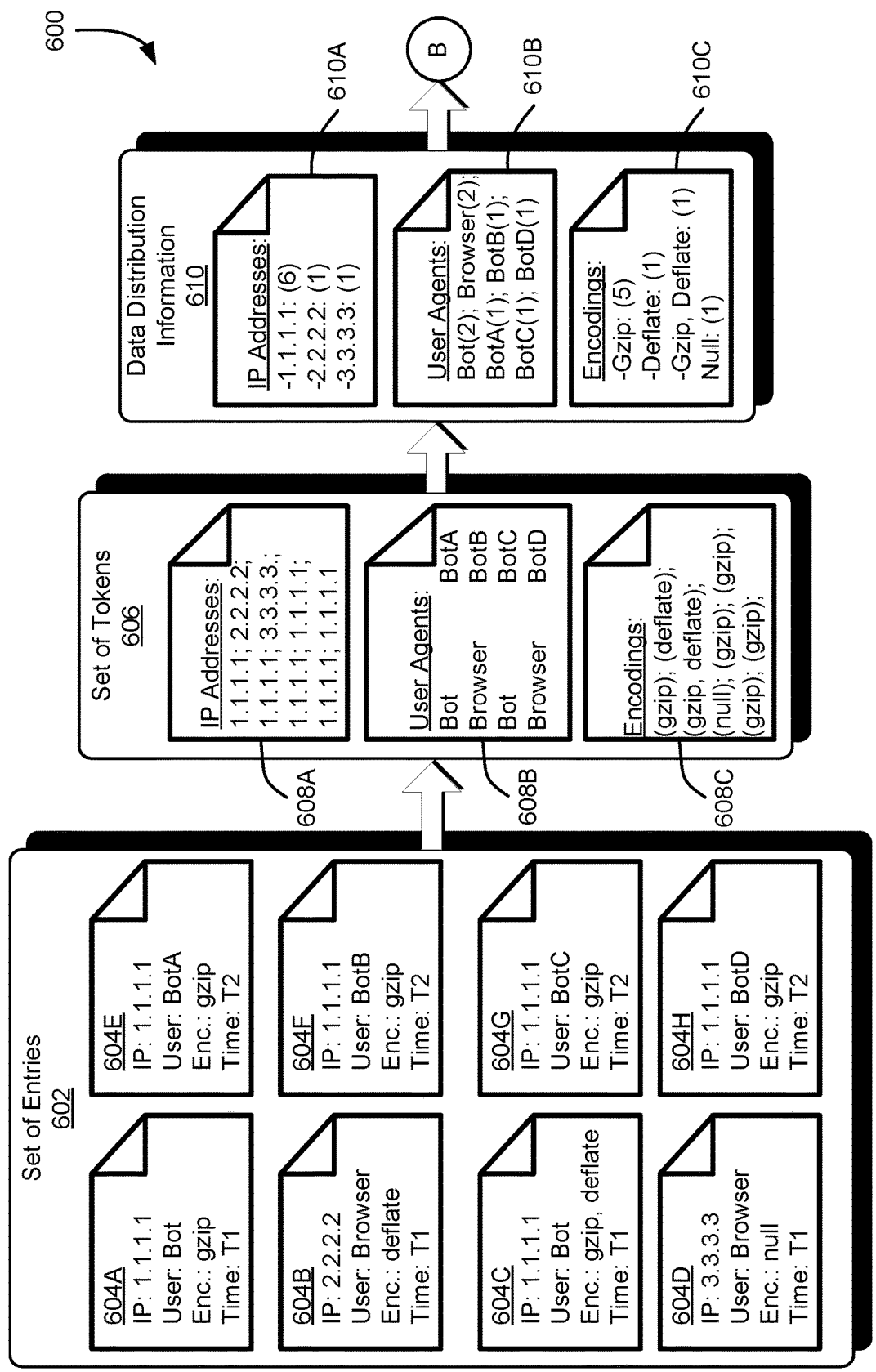
FIG. 6 shows a second diagram illustrating data processing for generating the signature of the anomalous network traffic event.

The data computation workflow service may analyze network traffic information received over a period of time to generate entropy information, detect anomalies, and generate a signature of anomalous network traffic events. FIG. 6 illustrates a diagram 600 of information generated by engines of the data computation workflow service of FIGS. 2, 3, and 4. As described above with respect to FIG. 4, the data management engine receives network traffic information from the proxy service and parses the network traffic information to generate a set of entries 602. Each entry 604 in the set of entries 602 corresponds to a communication received by the service provider, and each entry 604 comprises communication parameter data for each communication parameter used in communicating with the service provider over a network, as described above. The set of entries 602 is generated from a time period including a first time period T1 and a second time period T2. In particular, entries 604A through 604D (corresponding to entries 404A through 404D) are generated from network traffic information received at time period T1 whereas entries 604E through 604H are generated from network traffic information received at time period T2. A subset of the network traffic information identified in the set of entries 602 may be received from the proxy service and a second subset may be obtained from network traffic information data storage storing network traffic information previously received by the proxy service.

The data management engine may parse and tokenize the set of entries 602, or a subset thereof (e.g., entries 604E through 604H from the second time period T2), to generate a set of tokens 606. The set of tokens 602 include a first token 608A including IP address instances of the set of entries 602, a second token 608B including user agent instances of the set of entries 602, and a third token 608C including compression encoding instances of the set of entries 602. Generation of the set of tokens 606 is otherwise similar to generation of the set of tokens 406 described above, except that there are eight instances in each token, including instances from the first time period T1 and the second time period T2, instead of four instances. The data aggregation engine may generate data distribution information 610 from the set of tokens 606 in a manner similar to the aggregation process described above with respect to FIG. 4. The distribution information 610 may include first distribution information 610A identifying instances of the IP addresses in the first token 608A, second distribution information 610B identifying instances of the user agents in the second token 608B, and third distribution information 610C identifying instances of the compression encoding in the third token 608C.

Figure 7:
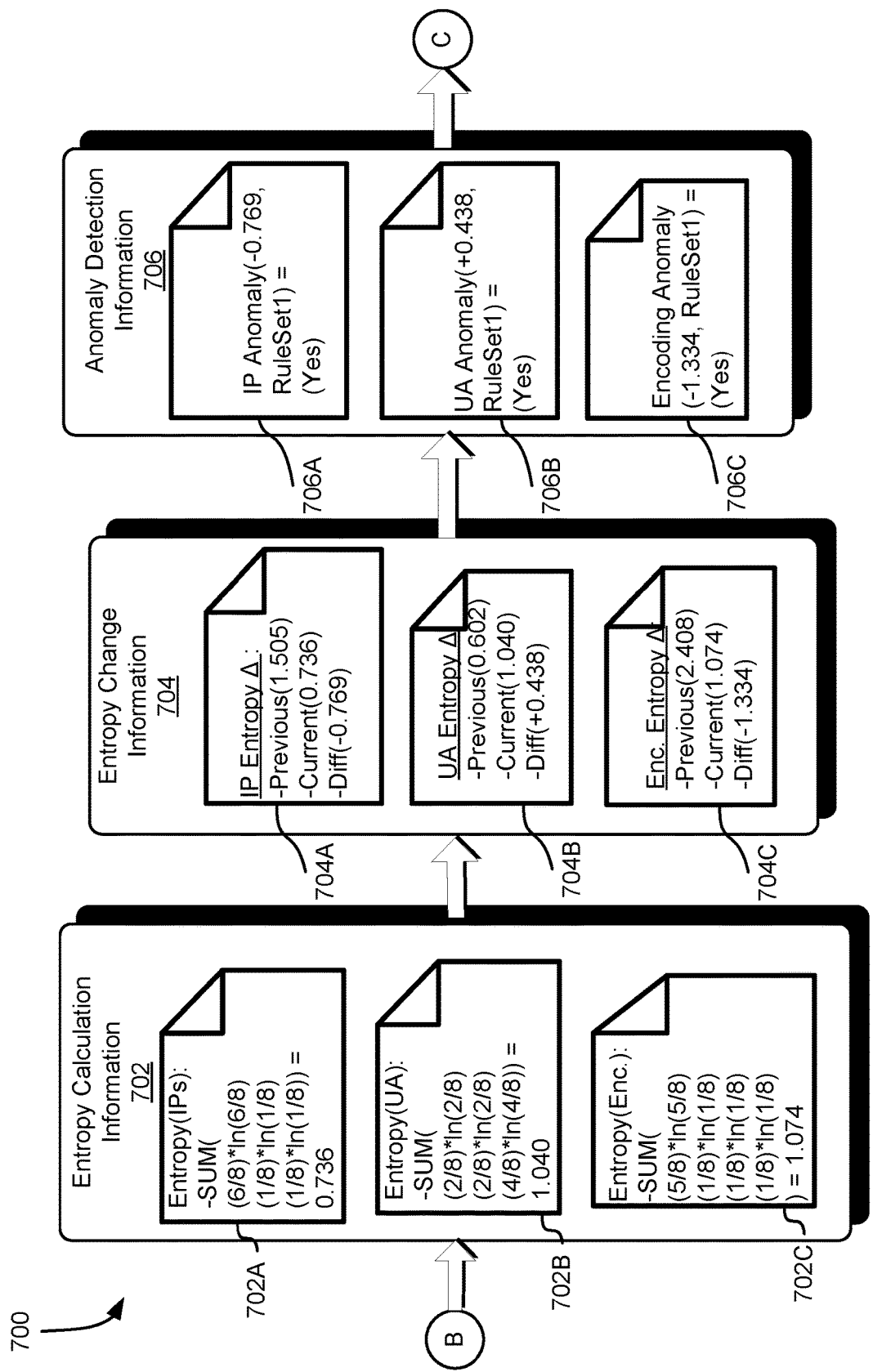
FIG. 7 shows a second diagram illustrating identification of anomalies based on entropy information.

FIG. 7 illustrates a diagram 700 of information generated by engines of the data computation workflow service of FIGS. 2 and 3. The entropy calculation engine calculates entropy calculation information 702 using the distribution information 610 and other information provided by the aggregation engine, in a manner similar to generation of the entropy calculation information 502 described above with respect to FIG. 5. The entropy calculation information 702 includes IP address entropy calculation information 702A generated using the first distribution information 610A, user agent entropy calculation information 702B generated using the second distribution information 610B, and compression encoding entropy calculation information 702C generated using the third distribution information 610C. Generating the entropy calculation information 702 also includes calculating an entropy value for each of the IP address entropy calculation information 702A ("0.736"), an entropy value for the user agent entropy calculation information 702B ("1.040"), and an entropy value for the compression encoding entropy calculation information 702C ("1.074").

The entropy change detection engine receives entropy calculation information 702 from the entropy calculation engine and generates entropy change information 704 therefrom. Generating entropy change information 704 includes, for one or more communication parameters, determining a difference between a current entropy value and an entropy value corresponding to entropy for a previous time period. For example, generating IP address entropy change information 704A includes determining a difference between the previous IP address entropy value and a current IP address entropy value—in this case, a difference (−0.769) between the entropy value (0.736) of the entropy information 704A and an entropy value (1.505) of the entropy information 502A. A user agent entropy change is determined as (+0.438) indicating an increase in user agent information entropy, and a compression encoding entropy change is determined as (−1.334) indicating a decrease in compression encoding entropy.

The anomaly detection engine receives the entropy change information 704 and generates anomaly detection information 706 indicating the presence or absence of an anomalous network traffic event based on the entropy change information 704. The anomaly detection information 706 is generated in a manner similar to the anomaly detection information 506 described above with respect to FIG. 5. Using a set of rules (e.g., "RuleSet1"), the anomaly detection engine determines that the IP address change information 704A corresponds to an anomalous network traffic event based on the decrease of (−0.769) in IP address entropy. Accordingly, the IP address anomaly information 706A indicates the presence of an anomalous network traffic event for the IP entropy change information 704A. The anomaly detection engine also determines the presence of an anomalous network traffic event based on an increase of (+0.438) in the user agent entropy information, as indicated in user agent anomaly information 706B; and based on a decrease of (−1.334) in the compression encoding entropy information, as indicated in compression encoding anomaly information 706C. Although the set of rules "RuleSet1" used to generate the anomaly detection information 706 results in a determination of the presence of an anomalous network traffic event for each communication parameter, the set of rules may result in a determination of the absence of an anomalous network traffic event for some communication parameters and a determination of the presence of an anomalous network traffic event for other communication parameters.

The processes 600 and 700 are described with reference to an analysis wherein data for a longer time period (e.g., time period comprising T1 and T2) is compared with data for a shorter time period (e.g., for time period T1). This process involves examination of how data for the system (e.g., entropy information) evolves or changes over time. However, the processes may involve comparing entropies from exclusive time periods. For example, the process may involve determining a difference between exclusive time periods, such as comparing a set of entropy values for a first time period (e.g., T2) with a set of entropy values for a second time period that does not include the first time period (e.g., T1). Those of ordinary skill in the art will appreciate that analysis comparing information for exclusive time periods may be computationally less expensive than an analysis using information collected over longer time periods (e.g., comparison of time period T1 with time period (T1+T2). However, such an approach may be less accurate in determining entropy for the development of network traffic re of the system over time.

Figure 8:
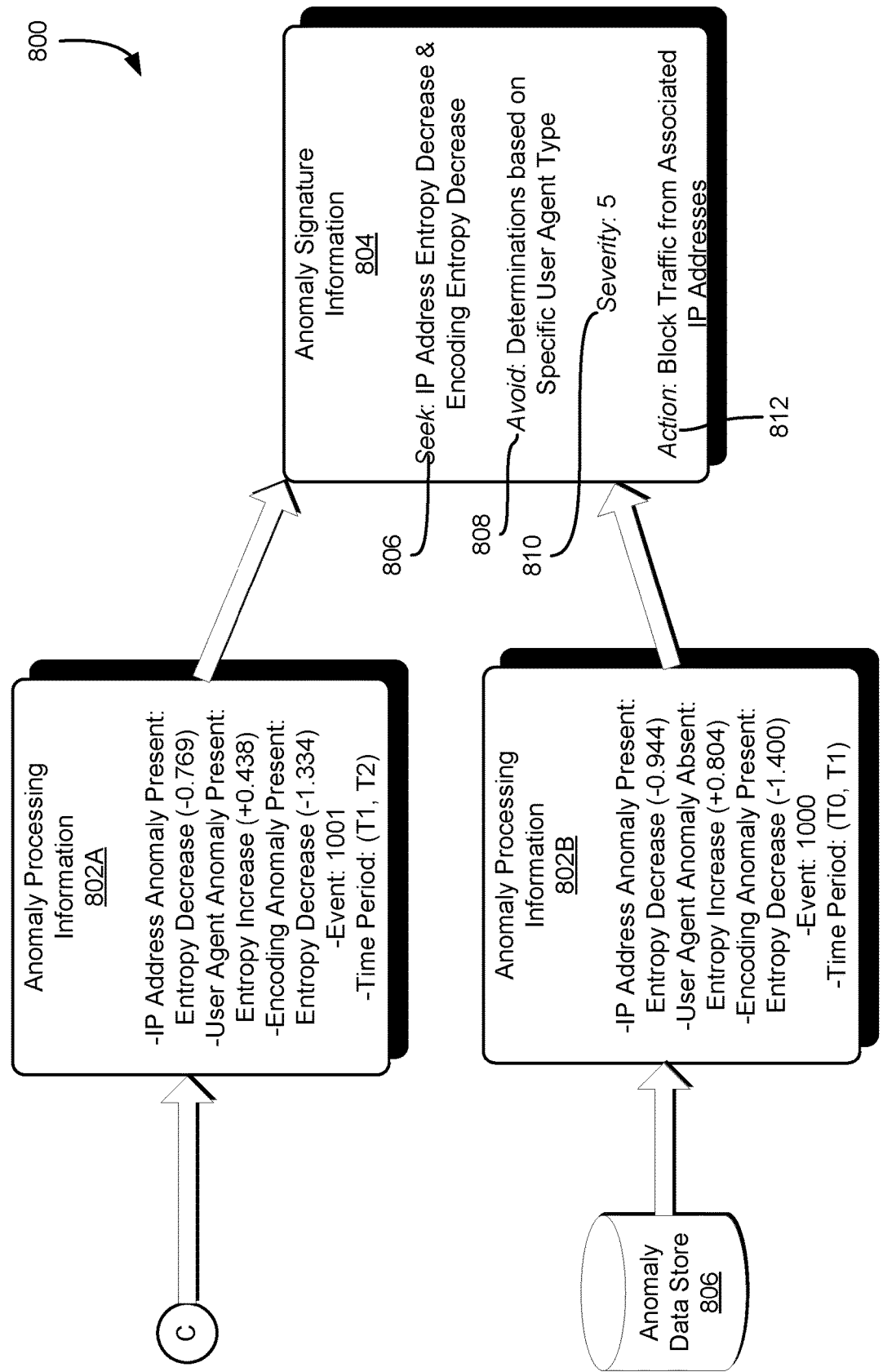
FIG. 8 shows processing anomaly data for generating the signature of the anomalous network traffic event.

FIG. 8 illustrates a diagram 800 of information generated in association with generating a signature of an anomalous network traffic event by engines of the data computation workflow service of FIGS. 2 and 3. The anomaly processing engine may generate anomaly processing information 802 based on anomaly detection information, as described above with respect to FIG. 7. The anomaly processing information may be received from the anomaly detection engine or may be obtained from an anomaly data store 806 storing previously generated anomaly information. The anomaly processing information 802A includes information generated by processing the anomaly detection information 706 described above. The anomaly processing engine generates an analysis, for the communication parameters, of characteristics or trends in entropy that resulted in a determination of the presence or absence of an anomalous network event. For instance, the processing information 802A indicates that, for the IP address parameter, a decrease in entropy of (−0.769) resulted in a determination that an anomalous network event occurred. For the user agent parameter, an increase in entropy of (+0.438) and, for the compression encoding parameter, a decrease in entropy of (−1.334) both resulted in a determination of the presence of an anomalous network traffic event. The processing information 802A may include an indication of the time period in which the network traffic information was received that was used to generate the corresponding anomaly detection information. For example, the processing information 802A includes information specifying that the set of entries 602 were obtained in a period of time including time period T1 and time period T2. The anomaly processing information 802 may include other information, such as information identifying a particular network traffic event associated with the network traffic information received.

The signature generation engine may generate anomaly signature information 804 using the anomaly processing information 802A. The signature generation engine may analyze the processing information 802A and observe or identify conditions, occurrences, or events that, if observed in network traffic information or associated information (e.g., entropy information, entropy change information), indicate that an anomalous network traffic is occurring, is likely to occur, or is about to occur. The observations or identifications made by the signature generation engine may be the result of correlating entropy changes with anomalous event causing entropy changes from one or more other time periods to determine trends or characteristics for the communication parameters. The signature information 804 may specify a set of entropy conditions that, if observed, indicate the presence of an anomalous network traffic event.

The signature generation engine may observe that a condition for one communication parameters in association with a condition for a different communication parameter correlates to the presence of an anomalous network traffic event in the processing information 802A. For example, that in association with network traffic giving rise to an anomalous network event, an entropy change for one communication parameter is accompanied by a change in entropy for another communication parameter. The change in one entropy parameter may not be the same as the change for the other communication parameter—for example, an entropy increase for one parameter may be accompanied by an entropy decrease in the other parameter. The signature generation engine may also observe that a condition for one or more of the communication parameters should be avoided or ignored as a consideration for an anomaly signature. That is, the signature information 804 may include an indication that a condition is not characteristic of the presence of an anomalous network traffic event. The signature generation engine may also generate other information to be included in the signature information 804, such as an indication 810 of the severity of the anomaly detected (e.g., how severe the effect of the anomaly may be on the service provider), an indication 812 of an action to be performed if the conditions specified in the signature information 804 are observed, or other information.

As one example, the signature information 804 includes an indication of conditions 806 to look out for or seek in detecting anomalous network traffic events. The conditions 806 indicate that an increase in entropy for the IP address parameter coupled with an increase in entropy for the compression encoding communication parameter is indicative of the presence, or imminent likelihood, of an anomaly in network traffic received. The signature generation engine observes that this is an important consideration based on the decrease in IP address entropy in conjunction with the decrease in compression encoding entropy reflected in the processing information 802A. The signature information 804 also includes an indication of conditions 808 to avoid looking for when detecting anomalous network traffic events. The conditions 808 specify that detection of an anomalous network traffic event based on a single user agent type should be avoided. This may be reflected by the fact that a single user agent type, such as many automated agents (e.g., Bot, BotA, BotB, BotC, BotD in the set of entries 602) in the network traffic information, is not necessarily indicative of the presence of an anomaly because this may actually cause an increase in entropy for the user agent communication parameter.

The signature generation engine may observe or identify numerical values and/or mathematical relationships that are indicative of an anomaly, and that are included in the conditions of the signature information 804 as a factor in identifying an anomalous network traffic event. The signature information 804 may specify a predetermined threshold for one or more of the communication parameters that, if exceeded, are indicative of the presence of an anomaly. The signature information 804 may, for instance, specify that an entropy change for a communication parameter exceeding a certain entropy change value may be a factor in determining the presence of an anomaly. The signature generation engine may observe or identify a statistical value, such as number of standard deviations from a mean value for the communication parameter, that may be a factor in determining the presence of an anomaly. The signature generation engine may observe or identify a time period in association with a numerical value or mathematical relationship, such as a change in entropy within a certain time period as a factor for identifying network traffic anomalies.

The signature generation engine may also consider previously generated anomaly processing information when identifying or observing conditions that are indicative of an anomalous network traffic event, which may include retrieving anomaly processing information from an anomaly data store. In the diagram 800, for example, the signature generation engine retrieves anomaly processing information 802B for generating the signature information 804 in conjunction with the processing information 802A. The anomaly processing information 802B specifies information from an anomaly occurring at a different time period (i.e., period of time from T0 to T1) than the time period of the processing information 802A (i.e., period of time, T1 to T2). The signature generation engine may identify or observe conditions that are common to a plurality of anomalies, which may increase the sample size and uncover characteristics in the processing information 802A and 802B that would be difficult to spot in processing information for a single anomaly.

The data computation workflow service recognizes consideration that there are various types of network traffic anomalies that the service provider may encounter, and that not all of the network traffic anomalies have an adverse effect on the service provider or warrant a response. The signature generation engine may receive an indication of a type of network traffic anomaly or an indication of whether an anomalous network event had a significant effect on the service provider. For instance, the anomaly processing information 802 may specify a type of anomaly associated with the anomaly detected, such as an indication that the anomaly detected is a DDOS attack or a result of an inordinately large amount of network traffic received due to an online marketplace sale. Accordingly, the signature generation engine may determine that the processing information for an anomaly of one type is irrelevant to an analysis for an anomaly of another type—for example, determining that anomaly processing information for malformed communications is irrelevant to an analysis for generating a signature of a DDOS attack. As another example, the processing information 802 may indicate that the processing information for an anomaly detected had an insignificant effect on the performance of the service provider, had a significant effect, or had a severe effect. The signature generation engine may attribute less weight to information for anomalies that had a less significant effect on the service provider, and strongly factor information for anomalies that had a more significant effect. The information regarding the significance or type of network traffic anomaly may be provided in a post-hoc manner by an authorized entity, such as a developer or system administrator.

The signature generation service may provide the signature information 804 to a traffic processing service, such as the traffic control service 114 or the application firewall 206. The signature information 804 is useable to observe or identify conditions that indicate the presence of an anomalous network traffic event. In response to observing conditions similar to those indicated in the signature information 804, the network traffic control service may perform— without human intervention—an action to stop or disrupt the network traffic event, prevent the network traffic event from adversely affecting the service provider, or otherwise remediate or mitigate the effects of the event. The action to be taken may be an action determined based on information in the signature information 804 or may be an action determined by the traffic processing service. Although the traffic event is described as being an adverse or undesirable event that the traffic processing service should circumvent, other types of events and reactions are contemplated. The data workflow service may detect increases in consumer network traffic to an online marketplace for which limiting network traffic would be undesirable. In response to detecting such instances of network traffic, the traffic processing service may cause actions to be performed to better accommodate the network traffic, such as by coordinating with load balancers and servers to increase the bandwidth available to process the additional network traffic.

Figure 9:
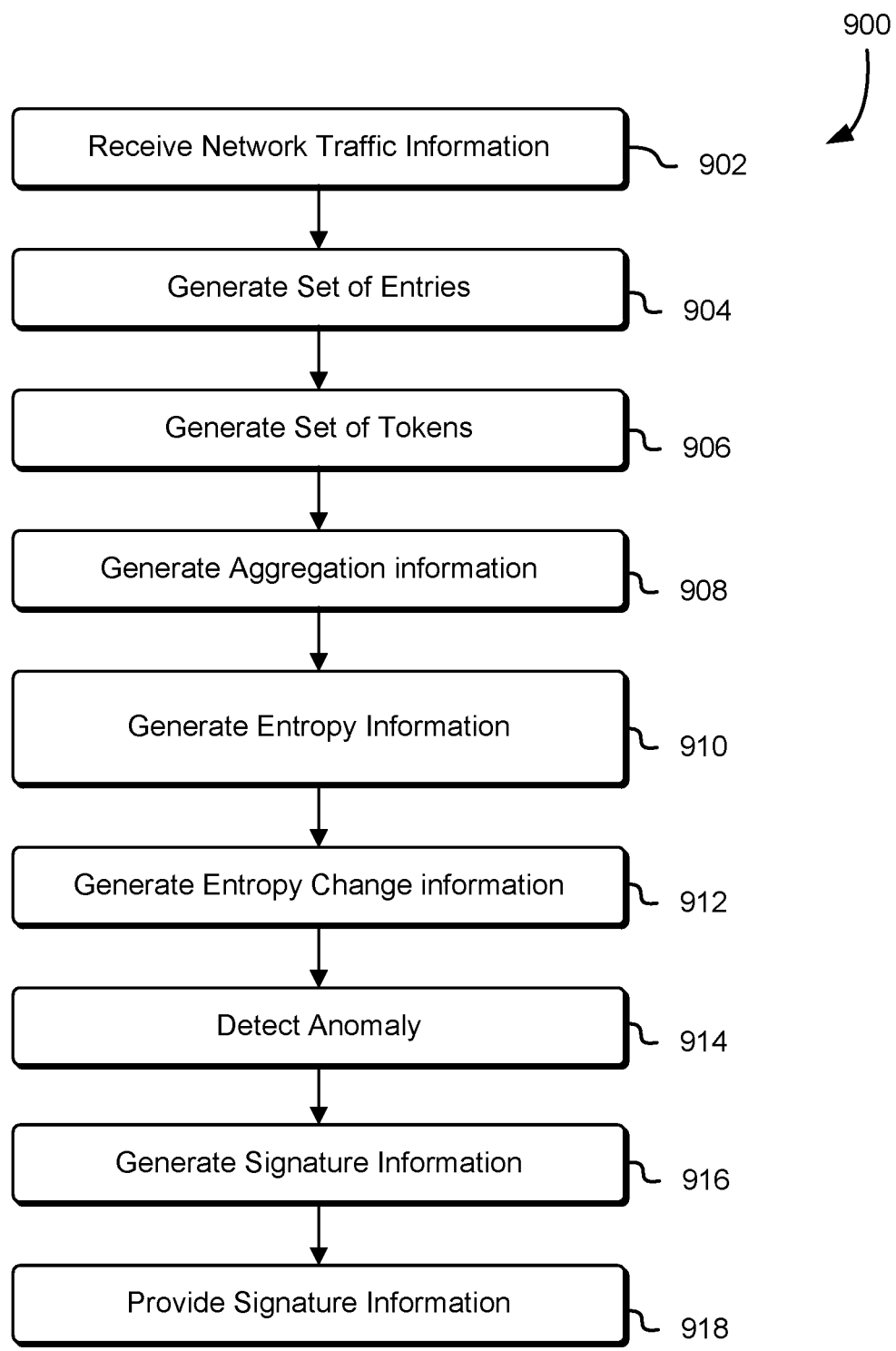
FIG. 9 shows a process for generating the signature of the anomalous network traffic event.

FIG. 9 illustrates a process 900 for generating a signature for one or more network traffic anomalies, as described herein. The process 900 may be performed by the data computation workflow service described above. The process 900 begins with the workflow service receiving 902 the network traffic information from the proxy service, as discussed above with respect to FIGS. 1, 2, and 3. The workflow service generates 904 a set of entries using the network traffic information, as described above with respect to FIGS. 4 and 6. From communication parameter data in the set of entries, the workflow service generates 906 a set of tokens each corresponding to a communication parameter of the network traffic information, as also described above with respect to FIGS. 4 and 6. The workflow service then aggregates or counts the instances of communication parameter data to generate 908 distribution information and other information regarding the set of entries (e.g., number of entries).

The workflow service uses the distribution information and other information to generate 910 entropy information including entropy values for each communication parameter, as described above with respect to FIGS. 5 and 7. The workflow service then determines a difference between the entropy values in the entropy information and entropy values for preceding network traffic information to generate 912 entropy change information including an entropy change for each communication parameter, as described above with respect to FIGS. 5 and 7. The workflow service then detects 914 one or more anomalies in the network traffic information based on the entropy change information and a set of rules for identifying or detecting communication parameter anomalies. Detecting anomalies may include generating anomaly detection information and anomaly processing information, as discussed above with respect to FIGS. 5, 7, and 8. The workflow service then generates 916 signature information indicating one or more conditions for detecting an anomalous network traffic event, as discussed above with respect to FIG. 8, and provide 918, or otherwise make available, the signature information to a traffic processing service.

Figure 10:
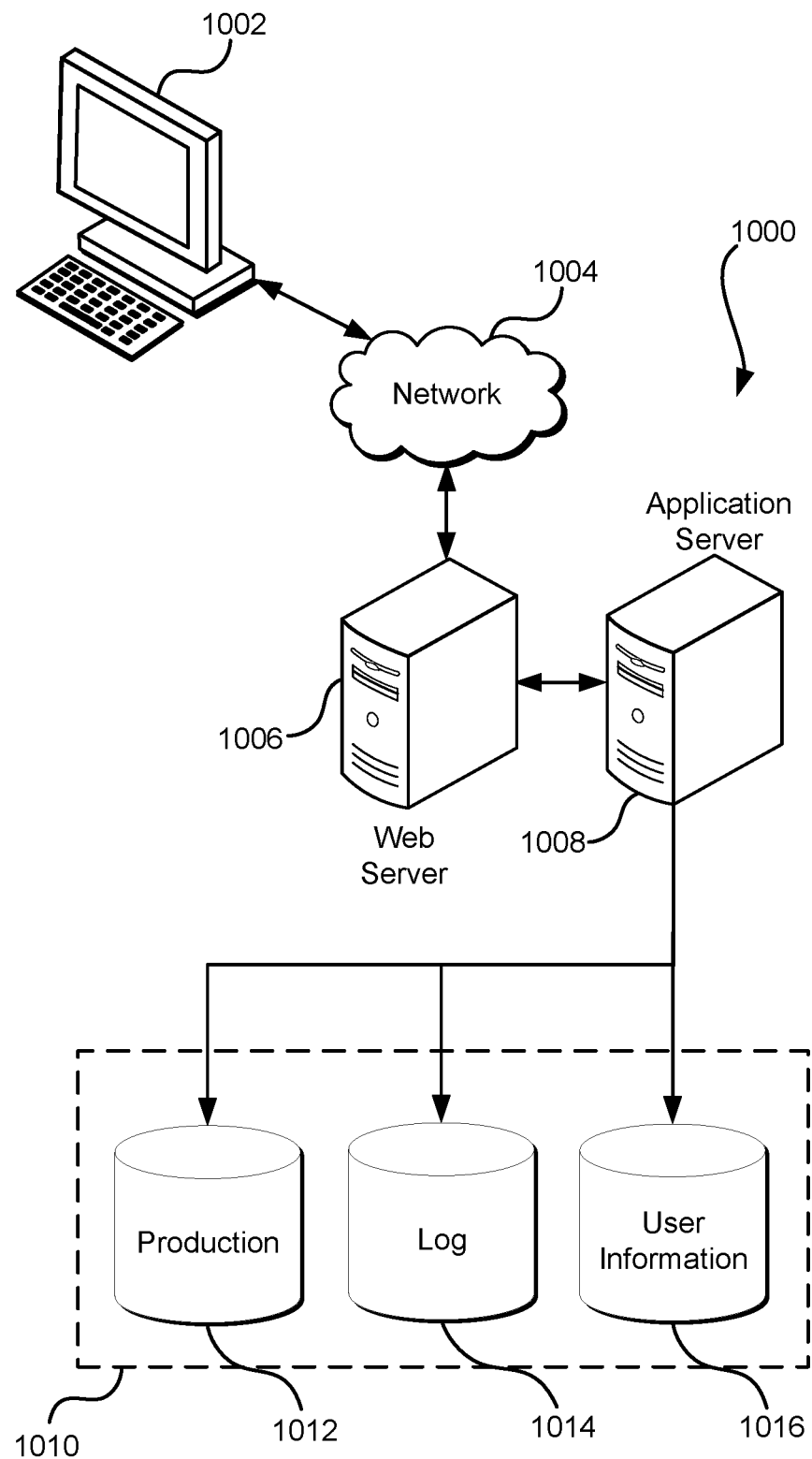
FIG. 10 illustrates an environment in which various embodiments can be implemented.

FIG. 10 illustrates aspects of an example environment 1000 for implementing aspects in accordance with various embodiments. As will be appreciated, although a web-based environment is useable for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components useable for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" or "data storage" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be useable for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining network traffic information corresponding to network traffic received at a computing resource service provider;
    processing the network traffic information into a set of entries including parameter data for a set of communication parameters used during communicating over a network with the computing resource service provider;
    generating distribution information indicating a number of instances of distinct entries in the parameter data included in the set of entries;
    calculating, using the distribution information, a set of entropy values for the set of communication parameters;
    calculating a set of entropy changes based on differences between the set of entropy values and a previously calculated set of entropy values for the set of communication parameters;
    identifying one or more anomalies in the parameter data, for one or more of the set of communication parameters, based at least in part on the set of entropy changes; and
    generating signature information characterizing a signature of a network traffic anomaly, the signature information including a first set of conditions indicating the presence of the network traffic anomaly and a second set of conditions indicating members of the set of communication parameters to ignore in detecting the presence of the network traffic anomaly.

2. The computer-implemented method of claim 1, further including:
    making the signature information available to a network traffic control service of the computing resource service provider, the signature information used by the network traffic control service to detect the presence of the network traffic anomaly by at least observing the first set of conditions in network traffic.

3. The computer-implemented method of claim 1, wherein the signature information is based at least in part on one or more characteristics of the one or more anomalies.

4. The computer-implemented method of claim 1, wherein the signature is characteristic of malicious network activity.

5. A system, comprising:
    one or more processors; and
    memory that stores computer-executable instructions that, upon execution, cause the one or more processors to:
        generate, based at least in part on network traffic data, a set of entries comprising parameter data for a set of communication parameters used to communicate over a network;
        determine entropy information for the set of communication parameters based at least in part on instances of data in the set of entries;
        detect one or more anomalies for the communication parameters based at least in part on a change in entropy for the set of communication parameters; and
        generate an anomaly signature to determine the presence of a network traffic event based at least in part on a first set of characteristics for at least a subset of the set of communication parameters and second set of characteristics for the subset of the set of communication parameters, the second set of characteristics indicating communication parameters not used to determine the presence of the network traffic event.

6. The system of claim 5, wherein the network traffic data is network traffic received at a proxy service of a computing resource service provider.

7. The system of claim 5, wherein the set of communication parameters including one or more of identification information for a user submitting a communication, software agent information of a software agent facilitating the communication, and header information.

8. The system of claim 5, wherein the network traffic event is a distributed denial of service attack directed at a computing resource service provider.

9. The system of claim 5, wherein the signature includes the first set of characteristics used to determine the presence of the network traffic event at a computing resource service provider.

10. The system of claim 5, wherein identifying the one or more anomalies includes determining that the change in the entropy information exceeds a threshold for one or more of the set of communication parameters.

11. The system of claim 5, the instructions further causing the one or more processors to:
control network traffic received at a computing resource service provider based at least in part on receiving network traffic matching one or more conditions included in the anomaly signature, the one or more conditions indicated by the first set of characteristics and the second set of characteristics.

12. The system of claim 5, wherein generating the anomaly signature includes determining a correlation between an anomaly for a first parameter in the set of communication parameters with an anomaly for a second parameter in the set of communication parameters.

13. A non-transitory computer-readable storage medium storing thereon executable instructions that, as a result of being executed by one or more processors of a computer system, cause the computer system to at least:
generate, based at least in part on network traffic data, a set of entries comprising parameter data for a first communication parameter used in communicating over a network;
calculate an entropy value for the first communication parameter based at least in part on instances of data in the set of entries;
determine that the entropy value is indicative of an anomaly for the first communication parameter based at least in part on a previous entropy value for the first communication parameter; and
generate a signature specifying a first condition for the communication parameter that, as a result of being observed in network traffic, indicates the presence of an anomalous network traffic event and a second condition for a second communication parameter that, as a result of being observed in network traffic, does not indicate the presence of the anomalous network traffic event.

14. The non-transitory computer-readable storage medium of claim 13, wherein the instructions further comprise instructions that, as a result of being executed by the one or more processors, cause the computer system to:
make the signature available to an application firewall of a computing resource service provider, the signature causing the application firewall to identify malicious network activity having characteristics matching the first condition.

15. The non-transitory computer-readable storage medium of claim 13, wherein the determination that the entropy value is indicative of the anomaly is based at least in part on a set of rules defining one or more conditions for detecting anomalies in the first communication parameter.

16. The non-transitory computer-readable storage medium of claim 13, wherein the instructions further comprise instructions that, as a result of being executed by the one or more processors, cause the computer system to determine distribution information indicating a count for instances in the parameter data, the distribution information used to calculate the entropy value.

17. The non-transitory computer-readable storage medium of claim 13, wherein the instructions that cause the computer system to generate the signature further comprise instructions that, as a result of being executed by the one or more processors, cause the computer system to analyze anomaly information obtained for a plurality of anomalies identified for the first communication parameter.

18. The non-transitory computer-readable storage medium of claim 17, wherein the set of entries comprises second parameter data for the second communication parameter, and the instructions further comprise instructions that, as a result of being executed by the one or more processors, cause the computer system to:
calculate a second entropy value for the second communication parameter;
determine that the second entropy value is indicative of an anomaly for the second communication parameter based at least in part on a previous entropy value for the second communication parameter; and
modify the signature by at least modifying the second condition to specify that the second condition for the second communication parameter, as a result of being observed in network traffic, indicates the presence of the anomalous network traffic event.

19. The non-transitory computer-readable storage medium of claim 13, wherein the second communication parameter corresponds to a user agent.

20. The non-transitory computer-readable storage medium of claim 13, wherein the instructions that cause the computer system to generate the signature further comprise instructions that, as a result of being executed by the one or more processors, cause the computer system to correlate the anomaly for the first communication parameter with a second anomaly for the second communication parameter that, as a result of being observed in the network traffic and in association with the first condition for the communication parameter, indicates the presence of the anomalous network traffic event.

* * * * *